C. N. DENNETT.
Carriage Seat.
No. 109,189.                    Patented Nov. 15, 1870.
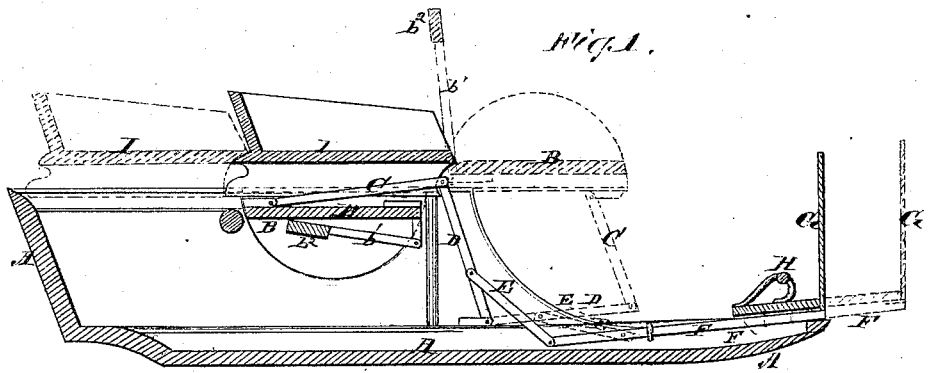
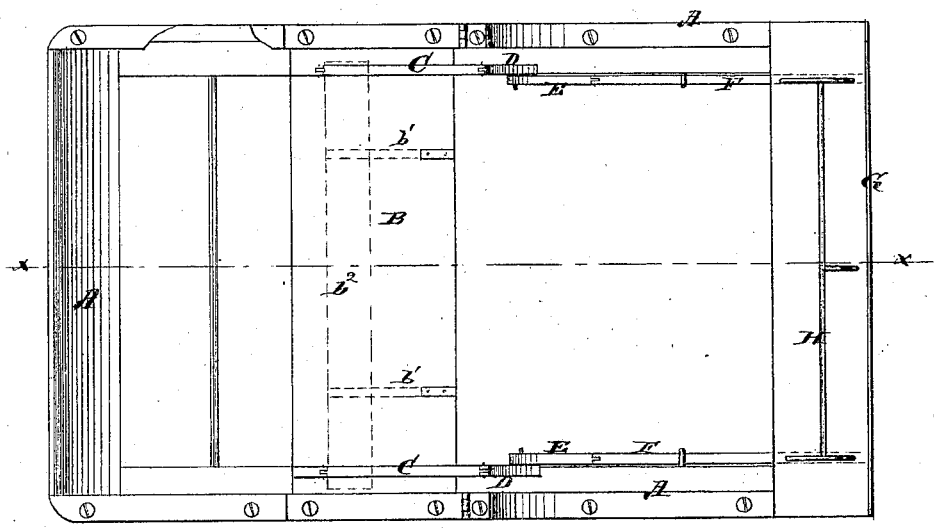
Witnesses:
John Becker
L. S. Mabee
Inventor:
C. N. Dennett
Per Munn & Co
Attorneys.

United States Patent Office.

CHARLES N. DENNETT, OF AMESBURY, MASSACHUSETTS.

Letters Patent No. 109,189, dated November 15, 1870.

IMPROVEMENT IN CARRIAGES.

The Schedule referred to in these Letters Patent and making part of the same.

*To all whom it may concern:*

Be it known that I, CHARLES N. DENNETT, of Amesbury, in the county of Essex and State of Massachusetts, have invented a new and useful Improvement in Carriages; and I do hereby declare that the following is a full, clear, and exact description thereof, which will enable others skilled in the art to make and use the same, reference being had to the accompanying drawing forming part of this specification, in which—

Figure 1 is a vertical longitudinal section of the body of an open buggy, to which my improvement has been attached, taken through the line x x, fig. 1.

Figure 2 is a top view of the same, the rear seat being removed.

Similar letters of reference indicate corresponding parts.

My invention has for its object to furnish an improved turn-out seat and extension front for light carriages, which are desired to be used sometimes with one and sometimes with two seats, which may be applied to open buggies, covered or top-buggies, and four-post carriages, with equal facility, and which shall be simple in construction and easily operated; and It consists in the construction, combination, and arrangement of the various parts of the turn-out seat and extension front, as hereinafter more fully described.

A is the body of the carriage, the forward part of the sides of which are cut away in the usual manner.

B is the forward or turn-out seat, the ends or arms of which are made semicircular in form, and fit into semicircular recesses in the middle part of the sides of the body A when said seat is turned back.

This construction allows easy access to the rear seat without disturbing the occupants of the forward seat when the said seat is turned out.

The arms $b^1$, that support the back-bar $b^2$ of the seat B, are jointed, as shown in fig. 1, so that when the said seat is turned back the said back-bar $b^2$ may be turned down upon the said seat and be out of the way.

To the forward part of the under side of the seat B are hinged the ends of the rods C, which support the said seat when turned out, as shown in dotted lines in fig. 1.

To the other ends of the rods C are hinged the ends of the rods D, the other ends of which are hinged to the lower part or frame of the body A.

To the rods D, at a little distance above their lower ends, are pivoted the ends of the inclined rods E, the other ends of which are pivoted to the rear ends of the rods F, which slide in keepers attached to the lower part or frame of the body A, and to the forward ends of which are attached the dash-board G and foot-rest H, so that when the seat B is turned out the dash-board and foot-rest may be pushed forward, and when the said seat B is turned back the said dash-board and foot-rest may be drawn back, thus extending the body of the carriage when two seats are to be used, and contracting it when only one seat is to be used.

I is the rear seat, which rests and slides upon the upper edge of the sides of the body A, so as to be pushed back, as shown in dotted lines in drawing, when two seats are to be used, and pushed forward over the turned-back seat B when only one seat is to be used.

Having thus described my invention,

I claim as new and desire to secure by Letters Patent—

1. The rods C D E F, combined as described, with the dasher and seat, for the purpose specified.

2. In a carriage-body, a sliding back-seat, I, and a turn-out front seat, B, combined with a sliding dasher G, to enable each to be adjusted to suit the contraction or elongation of the body.

3. A turn-out front seat, B, combined with a back, $b^1$ $b^2$, jointed and folding, as described, and for the purpose set forth.

CHARLES N. DENNETT.

Witnesses:
 JOSEPH MERRILL, Jr.,
 ALFRED HERBERT.